(12) United States Patent
Ezrielev et al.

(10) Patent No.: US 12,505,214 B2
(45) Date of Patent: Dec. 23, 2025

(54) CYBER RECOVERY FORENSIC KIT—APPLICATION-BASED GRANULARITY

(71) Applicant: Dell Products L.P., Round Rock, TX (US)

(72) Inventors: Ofir Ezrielev, Be'er Sheba (IL); Jehuda Shemer, Kfar Saba (IL); Amihai Savir, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 7 days.

(21) Appl. No.: 18/046,622

(22) Filed: Oct. 14, 2022

(65) Prior Publication Data

US 2024/0126879 A1    Apr. 18, 2024

(51) Int. Cl.
*H04L 9/40* (2022.01)
*G06F 21/56* (2013.01)

(52) U.S. Cl.
CPC ...... *G06F 21/566* (2013.01); *G06F 2221/033* (2013.01)

(58) Field of Classification Search
CPC . G06F 21/566; G06F 2221/033; G06F 21/568
USPC .......................................................... 726/24
See application file for complete search history.

(56) References Cited

U.S. PATENT DOCUMENTS

| | | | |
|---|---|---|---|
| 5,398,196 A | 3/1995 | Chambers | |
| 9,009,829 B2 | 4/2015 | Stolfo et al. | |
| 10,169,585 B1 | 1/2019 | Pilipenko et al. | |
| 10,878,084 B1 | 12/2020 | Voss et al. | |
| 10,885,191 B1 * | 1/2021 | Gupta | G06F 9/45558 |
| 2016/0080414 A1 | 3/2016 | Kolton et al. | |
| 2016/0132351 A1 | 5/2016 | Kashyap et al. | |
| 2017/0118241 A1 | 4/2017 | Call et al. | |
| 2017/0237771 A1 | 8/2017 | Miroshnikov et al. | |
| 2018/0114020 A1 | 4/2018 | Hirschberg et al. | |
| 2018/0165451 A1 | 6/2018 | Kawakita | |
| 2018/0167403 A1 | 6/2018 | Smith | |
| 2020/0210575 A1 | 7/2020 | Huang et al. | |
| 2021/0067553 A1 | 3/2021 | Ries et al. | |
| 2021/0124826 A1 * | 4/2021 | Matsuda | G06F 21/6218 |
| 2021/0157913 A1 | 5/2021 | Fralick et al. | |
| 2021/0176257 A1 | 6/2021 | Yavo et al. | |
| 2021/0209225 A1 | 7/2021 | Ghosh et al. | |
| 2021/0243226 A1 | 8/2021 | El et al. | |
| 2021/0336970 A1 | 10/2021 | Woo | |
| 2021/0349748 A1 * | 11/2021 | Dunfey | G06F 3/065 |

(Continued)

FOREIGN PATENT DOCUMENTS

WO    WO-2018038718 A1 *    3/2018    ............ G05B 19/05

OTHER PUBLICATIONS

Cybersecurity: Past, Present, and Future (Year: 2022).

(Continued)

*Primary Examiner* — Aubrey H Wyszynski
(74) *Attorney, Agent, or Firm* — Workman Nydegger

(57) ABSTRACT

A forensic kit with a granular infected backup. A forensic engine may evaluate a production system that is infected with malware or other corruption and generate a forensic kit. The forensic kit may include copies of components of the production system that are infected or that are sufficiently related to infected components. The forensic kit may be provided to investigators.

20 Claims, 6 Drawing Sheets

(56) References Cited

U.S. PATENT DOCUMENTS

| | | | |
|---|---|---|---|
| 2022/0100855 A1 | 3/2022 | Kumar et al. | |
| 2022/0398315 A1 | 12/2022 | Young et al. | |
| 2023/0009355 A1 | 1/2023 | Challener | |
| 2023/0239323 A1 | 7/2023 | Seletskiy et al. | |
| 2023/0254331 A1 | 8/2023 | Wright | |
| 2023/0396646 A1* | 12/2023 | Wang | H04L 63/145 |
| 2024/0086525 A1* | 3/2024 | Orazio | G06F 21/554 |
| 2024/0111865 A1 | 4/2024 | Ezrielev et al. | |
| 2024/0111866 A1 | 4/2024 | Ezrielev et al. | |
| 2024/0111867 A1 | 4/2024 | Ezrielev et al. | |

OTHER PUBLICATIONS

IBM Security Solutions Architecture for Network, Server and Endpoint (Year: 2011).

Alhaidari et al. "ZeVigilante: Detecting Zero-Day Malware Using Machine Learning and Sandboxing Analysis Techniques" (Year: 2022).

\* cited by examiner

CYBER RECOVERY FORENSIC KIT—APPLICATION-BASED GRANULARITY

FIELD OF THE INVENTION

Embodiments of the present invention generally relate to a data protection system and data protection operations. More particularly, at least some embodiments of the invention relate to systems, hardware, software, computer-readable media, and methods for a forensic kit for granular forensic analysis.

BACKGROUND

Computing systems today are under seemingly constant attack from malicious actors. As a defense, computing systems include applications that are configured to protect against trojans, spyware, adware, rootkits, ransomware, and worms, to name a few.

Notwithstanding the protection afforded by these applications, malware is continually evolving and may succeed in compromising a computing system. When a computing system is compromised, the damage is often significant, and the consequences can be severe. Malware may encrypt production data and demand a ransom. Malware may steal passwords and then steal valuable company data. Malware may be used to illegally access banking accounts for fraudulent purposes.

Delays in recovering from a malware attack may not be limited to the removing the malware and/or fixing the damage. For example, malware attacks are often investigated by various groups including law enforcement and insurance companies. The investigations performed by these two groups may introduce significant delays into the process of restoring the production system from a malware incident.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data operations including forensic operations. More particularly, at least some embodiments of the invention relate to systems, hardware, software, computer-readable media, and methods for granular or scalable data protection operations, including granular forensic operations.

In general, example embodiments of the invention relate to a forensic kit that, by way of example, can be provided to investigative entities such as law enforcement and insurance. When malware is detected in a production system, a forensic system may generate a forensic kit that includes an infected backup of the production system. The backup may be a full backup, a snapshot, or the like. The backup contains the production system at the time the malware was detected and thus includes the malware.

The forensic kit can be provided to the investigative entity. Because the infected backup may be a complete copy of the production system, the investigative entity is, in effect, investigating the actual production system at the time the malware was detected or at the time the infected backup was generated. The backup included in the forensic kit may be complete and include copies of operating systems, active directories, RAM, applications, data, or the like. Although reference is made herein to an infected backup, the infection may include malicious data, corrupted data, encrypted data, or other anomalies.

Advantageously, the investigative entity is able to conduct their investigation at their own pace while entity affected by the malware can begin recovering from the malware according to their schedule rather than being subject to investigative delays.

Embodiments of the invention further relate to generating a granular forensic kit. The backup included in a granular forensic kit may include copies only of relevant components of the production system. More specifically, the forensic system may be configured to identify components of the production system that have been actually infected or that are sufficiently related to the infected component. The granular infected backup may include less than all of the production system components. By granularly generating the infected backup, the investigation can be performed in a more focused manner and more quickly.

Figure 1:
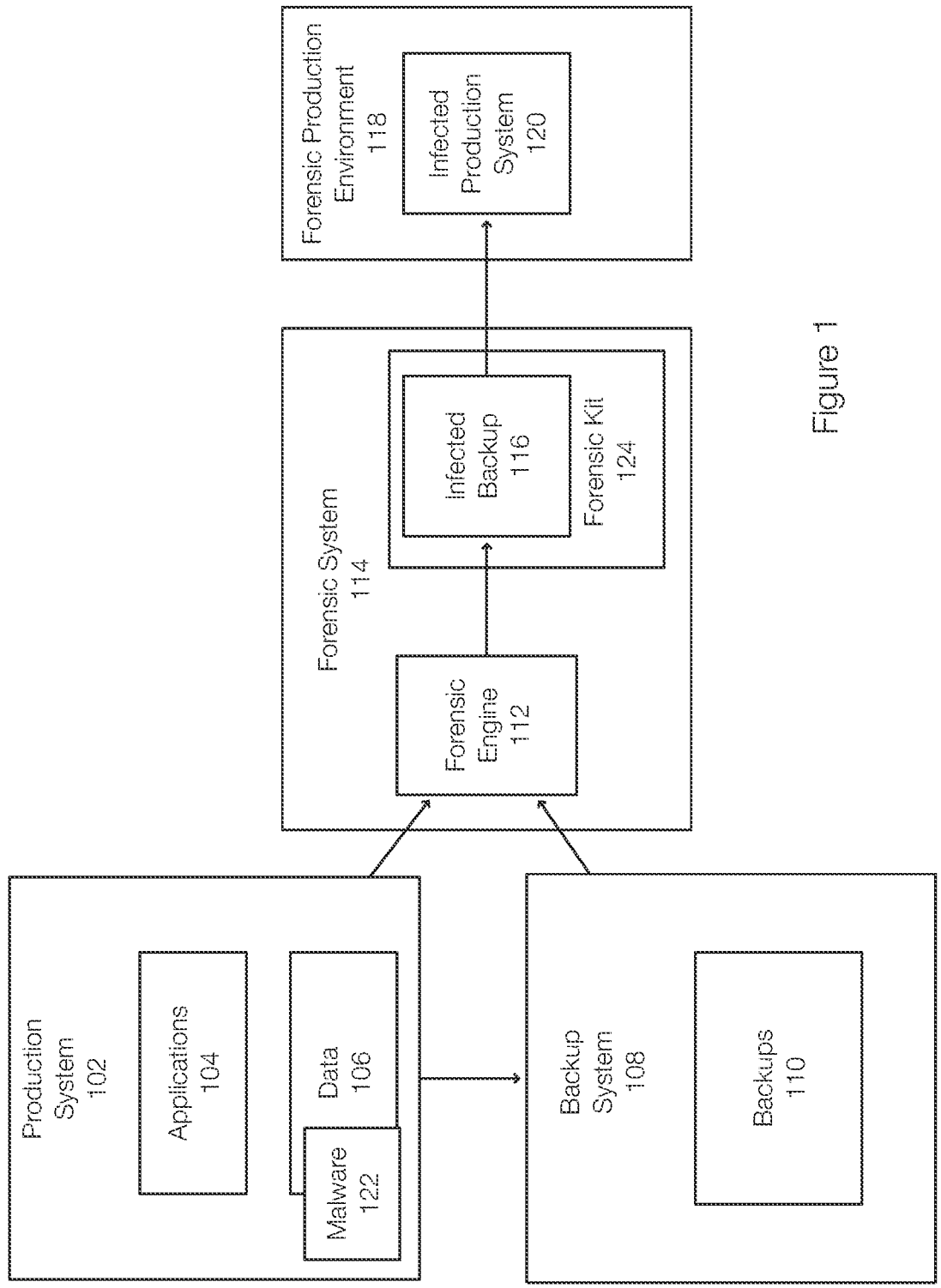
FIG. 1 discloses aspects of a cyber recovery forensic kit.

FIG. 1 discloses aspects of a forensic system that generates a forensic kit. In one example, the forensic system may be part of a data protection system that is also configured to generate backups and perform other data protection operations. The forensic system 114 may include a forensic engine 112 that operates in or with respect to a production system 102. In this example, the production system 102 includes applications 104 and data 106. Often, the applications 104 may be deployed on servers or other hardware and the data 106 may be stored on storage devices. Thus, reference to a server may refer to an application and its data, even when on distinct devices.

For example, an email application may operate on a server or a cluster or servers and a database operation may operate on another server or cluster of servers. The data of the email application may be on a storage system that is separate from the database used by the database application. However, the email data and the database may be in different volumes of the same storage system. These types of systems are represented generally by the applications 104 and data 106 of the production system.

A backup system 108 may be associated with the production system 106. The backup system 108 generates backups 110 of the production system 102. The backups 110 therefore represent one or more backups of the applications 104 and/or data 106 of the production system 102. The manner in which applications 104 and/or data 106 are backed up may vary. The backups may be PiT (Point in Time) backups, full backups, incremental backups, snapshots, replicas, or the like.

Regardless, when malware 122 impacts or is discovered in the production system 102 (or is discovered in the backups 110), the forensic engine 112 may generate an infected backup 116. In other words, the infected backup 116 is specifically captured such that the infected backup 116 includes the malware 122. In one example, however, the forensic kit may also include non-infected data, such as recent non-infected backup. This allows for comparisons to be performed, including for specific data that has been infected.

The forensic engine 112 may include a detection engine configured to detect the malware 122. When triggered, the forensic engine 112 is able to perform forensic operations such as generating the infected backup 116, stopping (at least temporarily) the production system 102, which may prevent further harm to the data 106 or more generally to the production system 102, or other preventative or protective action.

The infected backup 116 is part of a forensic kit 124 that can be provided to an investigative entity as a package that includes the infected backup 116. During the investigation, the infected backup 116 may be deployed to a forensic production environment 118, which may be configured to run an infected production system 120 such that the production system 102 can be investigated and analyzed forensically via the infected production system 120. The infected production system 120 exists in a state in which an investigator can perform an investigation. The infected production system 120, if desired, may also be able to operate in a sandbox or other appropriate environment.

The analysis and forensics performed on the infected production system 120 may determine how the malware 122 was introduced, which application/data were actually compromised, or the like. The investigators may also try to find clues regarding the origin of the malware 122, an identify of the malicious actor, or the like. The infected backup 116 can be deployed to multiple environments such that various tests or analytics can be performed in parallel.

The production system 102, however, can be quite large in some instances and in many examples, some of the applications 104 or other components may not be impacted or affected by the malware 122. As a result, the infected production system 120 may include portions that may be examined unnecessarily or without benefit at least because nothing useful to the investigation is present.

The forensic system 114 is further configured to generate infected backups in a granular or selective manner. This allows the production system 102 to be viewed as components that can be selectively included or excluded from the infected backup 116.

Figure 2:
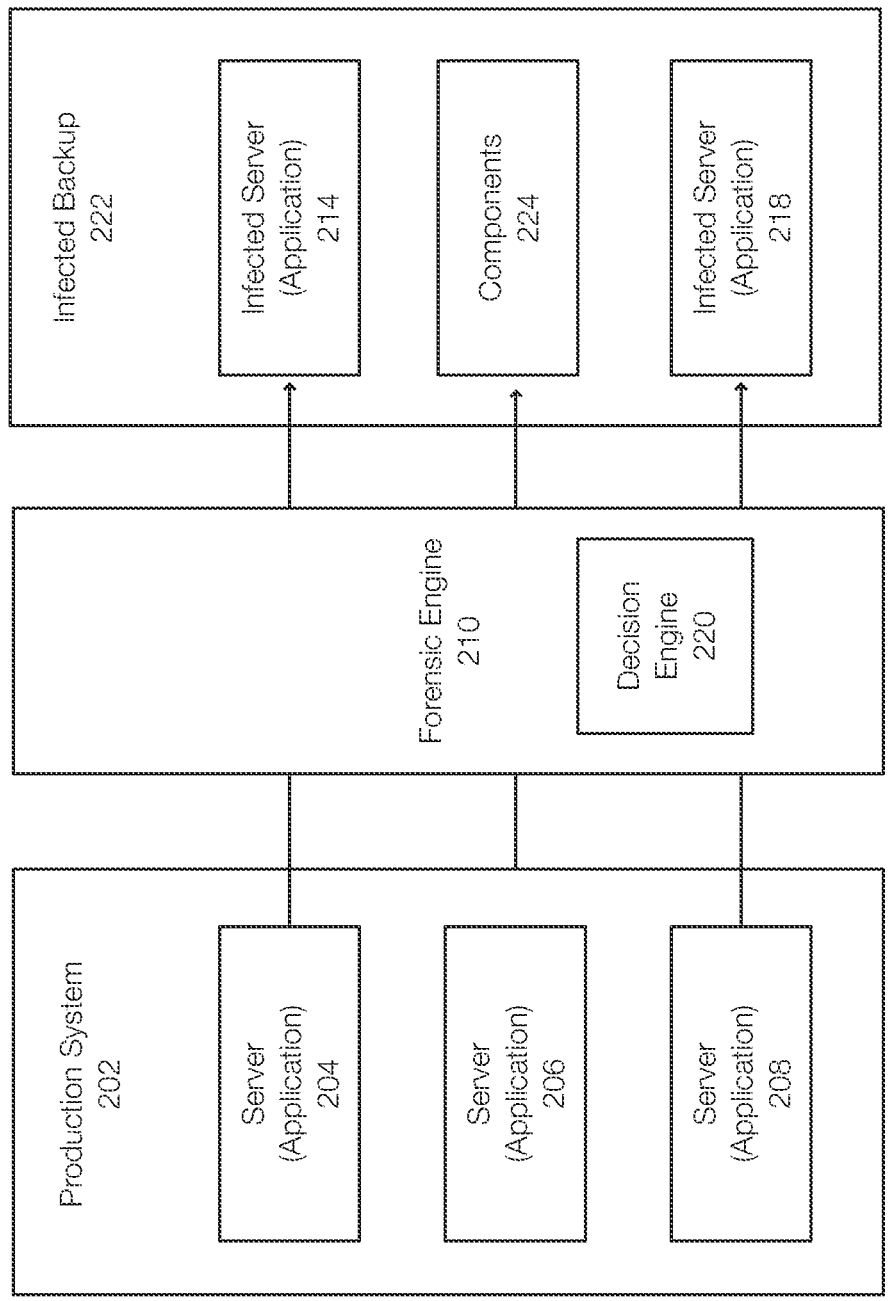
FIG. 2 discloses aspects of granular forensics using a forensic kit.

FIG. 2 discloses aspects of a forensic engine configured to generate infected backups in a granular or selective manner. The forensic engine 210 may include a decision engine 220 configured to identify the granularity with which the infected backup 222 is generated. Stated differently, the decision engine 220 may identify and/or infer which components of the production system to include in the infected backup 222.

FIG. 2 illustrates a production system 202 that includes servers (applications/data) 204, 206, and 208. When the forensic engine 210 detects malware or whenever a forensic backup operation is triggered or initiated, the decision engine 220 may generate or make a decision/inference regarding how the infected backup 222 of the production system 202 is generated.

More specifically, the decision engine 220 may identify components to be included in the infected backup 222. In this example, the decision engine 220 may determine that the server 204 and the server 208 include corruptions or anomalies or are otherwise infected. This decision or inference by the decision engine 220 may cause the forensic engine 210 to include the infected server 214, which is a backup of the server 214, and the infected server 218, which is a backup of the server 208, in the infected backup 222. If the decision engine 220 determines that the server 206 is not infected or otherwise corrupted, the server 206 may not be included in the infected backup 222.

The decision engine 220 may perform multiple levels of stages of analysis in determining what portion or components of the production system 202 to include in the infected backup 222. As previously stated, the decision engine 220 may determine or infer that the servers 204 and 208 are directly impacted by the malware or other triggering event and are included in the infected backup 222.

A second layer or stage of the decision engine 220 may be configured to identify additional or related components 224 to include in the infected backup 222. For example, the decision engine 220 may identify components (e.g., applications, networking, directories including active directory, RAM) that may be relevant to the investigation even if not directly harmed by the malware or other corruption. In one example, the components 224 are identified using a causal graph or a GNN (Graph Neural Network). In one example, this may include components that may have been used as attack vectors, even if these components do not appear to be infected or corrupted.

Figure 3:
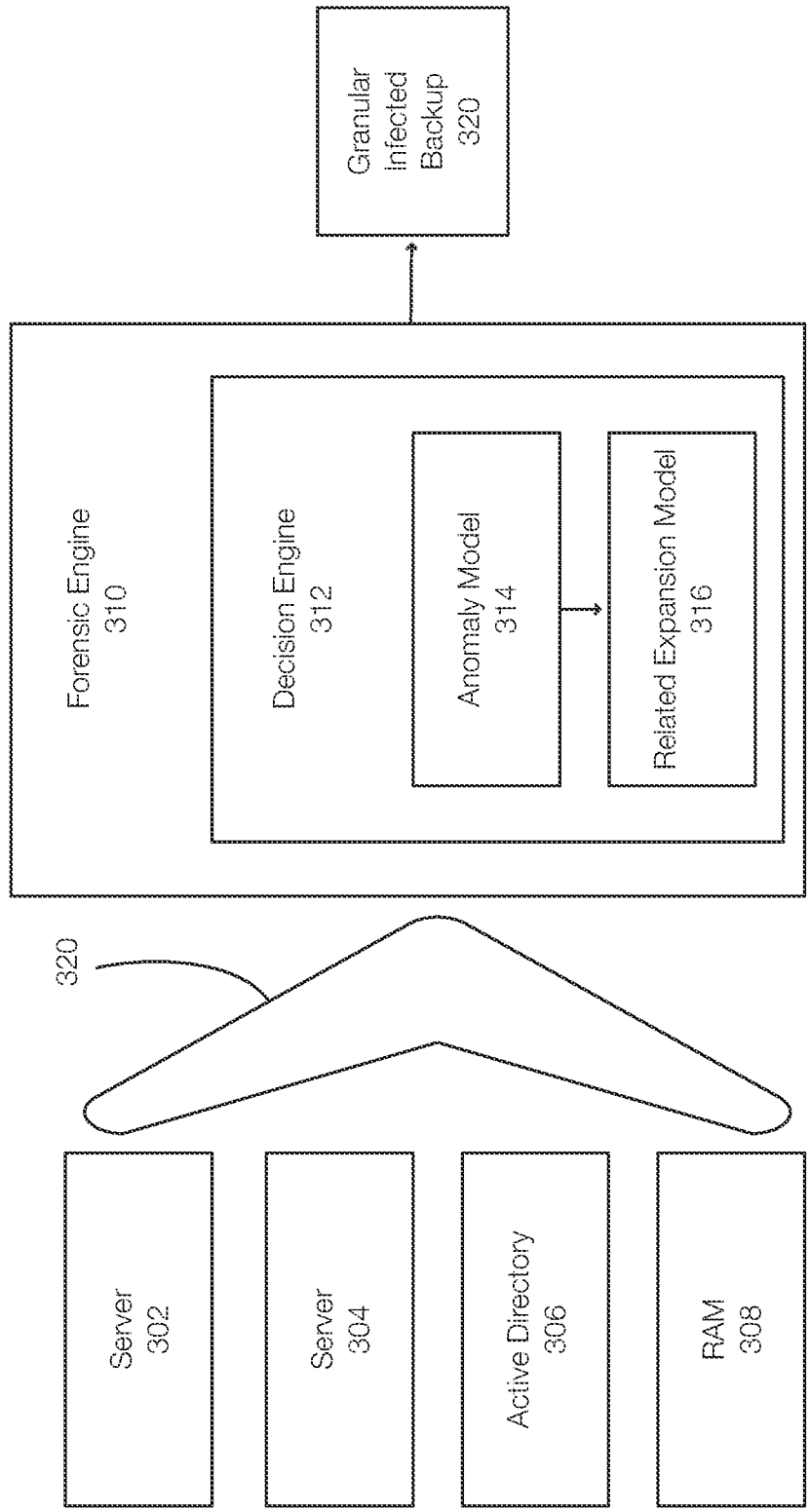
FIG. 3 discloses aspects of identifying components to include in a granular infected backup.

FIG. 3 discloses additional aspects of the decision engine in a granular forensic system. In this example, the decision engine 312 includes, by way of example only, two machine learning models: an anomaly model 314 and a related expansion model 316. The input 320 to the decision engine 312 or to the models 314 and 316 may include information from components of the production system, production system features, or the like. These components, illustrated by way of example, may include servers (e.g., applications/data) 320 and 304, active directory 306, RAM 308, and the like.

More specifically, the anomaly model 314 may be configured to detect anomalies, corruption, or other unauthorized actions or functions. In one example, backup images may be indexed, for example at a content level. Each of the backup images may be analyzed for corruption. Various analytics and statistics may be generated from the analysis. Using these statistics, characteristics and/or features, the anomaly model 314 may be able to compare one backup to another backup or to recognize anomalies within a backup image. In one example, the input to the anomaly model 314 may include corrupted data and other metadata related to the components. An example of the model 314 is CyberSense for PowerProtect Cyber Recovery.

Using this type of data to generate a training database allows the anomaly model to be trained on various types of malware and other attack vectors. The anomaly model 314 may be trained on various types of malware. Thus, the anomaly model 314 may be trained to recognize malware in a component of the production system based on features or other characteristics of analytics of the production system. This allows the anomaly model 314 to identify components that have been infected by the malware. Components identified by the anomaly model 314 are included in the granular infected backup 320. The output of the anomaly model 314 may be, for each component, a probability of infection. Components associated with a probability above a threshold value are included in the infected backup 320.

For example, the anomaly model 314 may determine that the server 302 and the server 304 are corrupted or infected. When generating the infected backup to include in a forensic kit. Thus, the output of the anomaly model 314 ensures that the server 302 and the server 304 are included in the granular infected backup 320 of the forensic kit. The forensic kit may be provided to multiple investigators.

The related expansion model 316 may look for components or applications that may be related to the components or applications identified by the anomaly model 314. Thus, the output of the anomaly model 314 may be input to the related expansion model 316. The related expansion model 316 may be embodied as a GNN or a causal graph, for example. A GNN may be configured to generate inferences based on graph data, for example.

More specifically, the anomaly mode 314 may identify data that may be infected or otherwise corrupted. The related expansion model 316 may look at system components and their interactions and learns which components are relevant to the forensic kit. If the anomaly model 314 determines that data X is infected or corrupted, the related expansion model 316 may determine which components are relevant to the data X. The input to the related expansion model 316 may be, in one example, the production system or portion thereof in graph form. The nodes of the graph may represent components and the edges may represent relations between the components. The input may also identify what data is corrupted.

Figure 4:
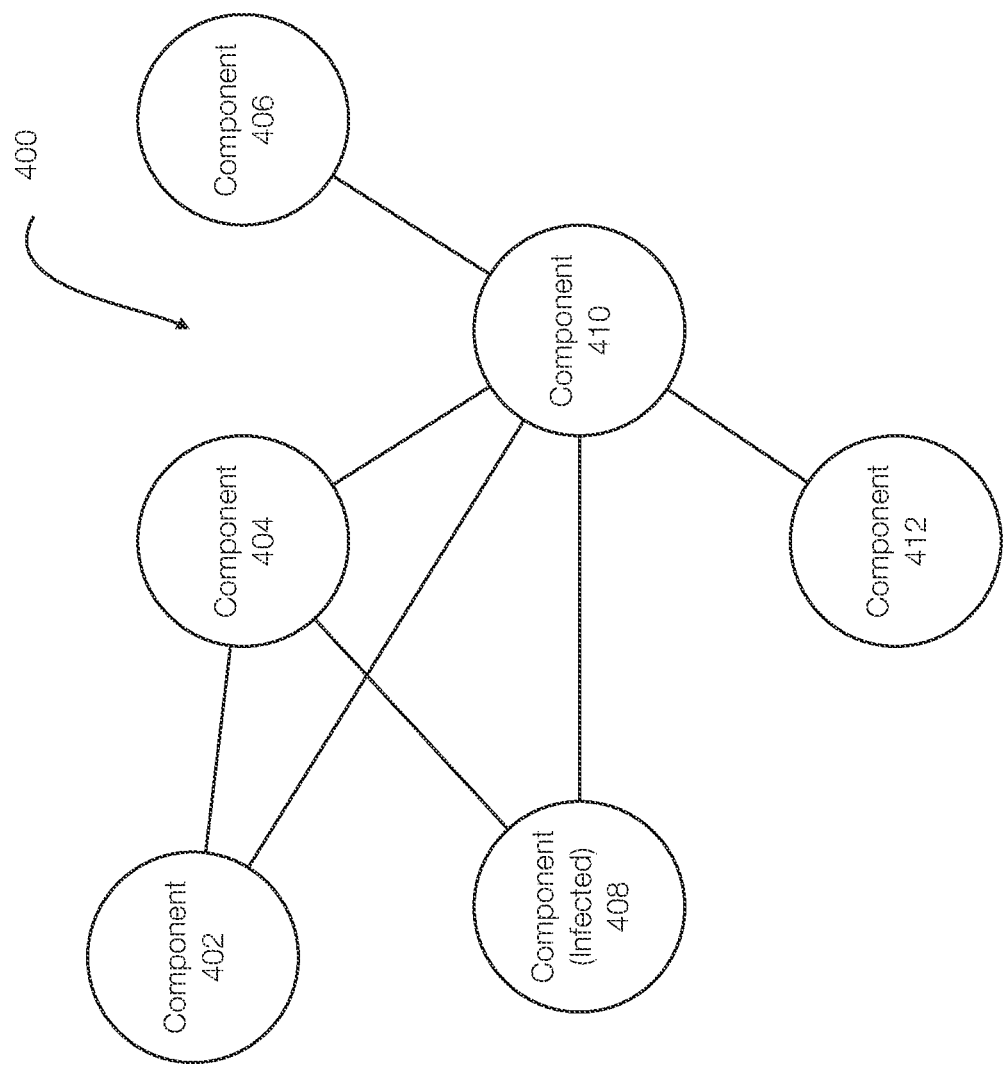
FIG. 4 discloses aspects of a causal graph.

FIG. 4 discloses aspects of an example graph. The graph 400 may represent a computing system. The nodes of the graph include nodes or components 402, 404, 406, 408, 410, and 412 each represent a component of the production system. Components may include RAM, active directory, applications, disk drives, volumes, storage systems, networking, or the like. The edges, which may be directional, may represent relationships between the nodes or components. In this example, the component 408 may represent an application and is an infected component. Thus, the anomaly model may indicate that the component 408 should be included in the infected backup.

The related expansion model 316 may receive the graph 400, which now identifies the infected component 408 (the infected data may be provided separately from the graph) as input. The related expansion model 316 may output classifications, predictions, communities, or the like. This allows components related to the infected component 408 (or more generally to specifically identified infections or data) to be identified. In this simple example, the related expansion model 316 may indicate the components 404 and 410 are in the same community as the infected component 408. As a result, the components 404 and 410 may be included in the infected backup. If the components 406 and 412 are in a different community, the components 406 and 412 may be excluded from the infected backup.

Nodes of a graph that are classified into the same classification may cause the corresponding components to be included in the infected backup.

These decisions can be influenced by the type of malware detected, the physical configuration of the production system, which applications access which volumes or storage, the use of active directory, shared caches, or the like.

The output of the related expansion model 316 may identify components that are likely related to the infected components and should be included in the infected backup of the forensic kit.

Figure 5:
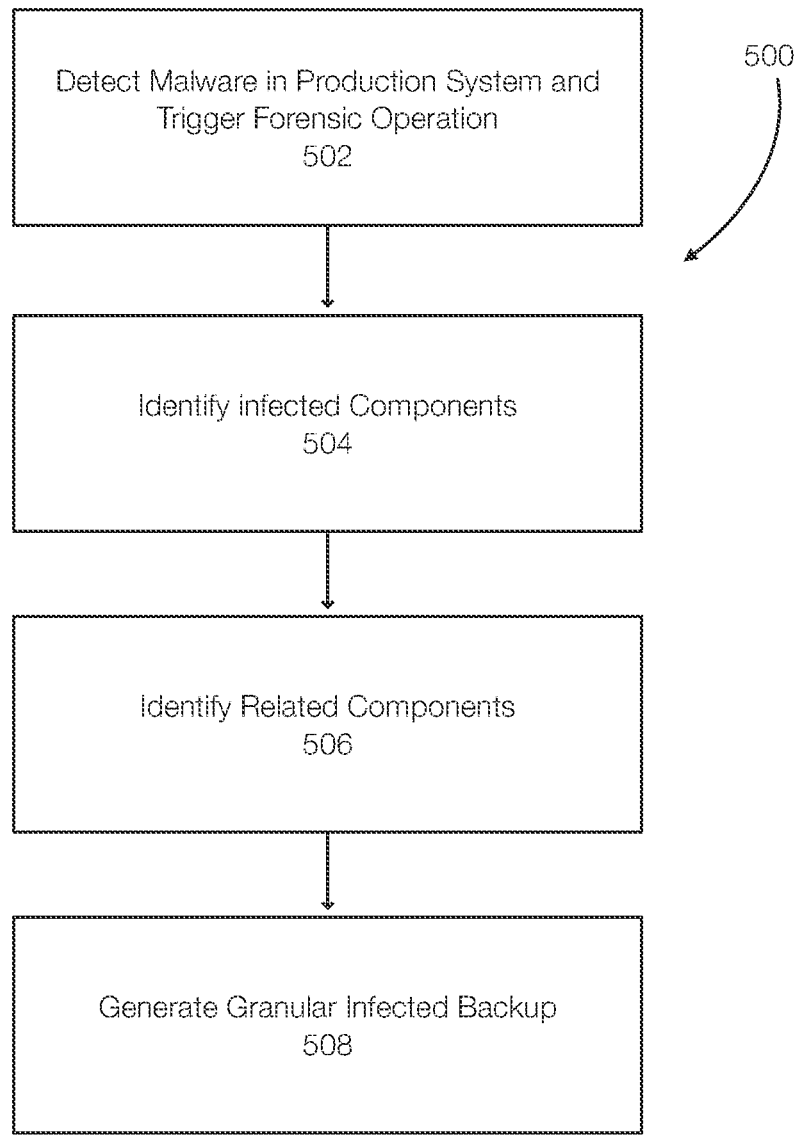
FIG. 5 discloses aspects of generating a granular cyber recovery kit.

FIG. 5 discloses aspects of a forensic operation to generate a granular backup. The method 500 may detect 502 malware in a production system. The malware may be detected by a data protection system that includes or is associated with a forensic engine. When the malware is detected, a forensic operation is triggered and performed by the forensic engine.

Using features or other characteristics of a production system or of the components, infected components of the production system are identified 504. Infected components may be identified by an anomaly model that has been trained to recognize corruption, malware infection, malware, or the like. Based on the infected components, components that may be infected (e.g., related components) are identified 506. The related components may be identified using a GNN or a causal graph or other trained model. The GNN may receive a graph as input that may identify the infected components. This information allows the GNN or causal graph to identify related components to the infected components.

Once the infected and related components are identified, the granular infected backup is generated 508 and includes components identified by the two models of the decision engine. The granular infected backup may be included in a forensic kit and provided to an investigator for analysis.

In one example, the infected and related components may be identified before the granular infected backup is generated. In another example, an infected backup is generated. The infected components and the related components may be extracted from the infected backup based on outputs of the anomaly and related expansion models of the decision engine.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC PowerProtect Cyber Recovery platforms and associated backup software, and storage environments. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines containers, or virtual machines (VM), though no particular component implementation is required for any embodiment.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: detecting malware in a production system that includes components, identifying infected components from among the components of the production system, identifying related components of the production system from among the components that are related to the infected components, and generating a granular infected backup that includes the infected components and the related components and the malware.

Embodiment 2. The method of embodiment 1, further comprising triggering a forensic operation upon detecting the malware, wherein the forensic operation is configured to generate the granular infected backup.

Embodiment 3. The method of embodiment 1 and/or 2, wherein the granular infected backup comprises a snapshot of the infected components and the related components.

Embodiment 4. The method of embodiment 1, 2, and/or 3, wherein the components include servers, applications, data, storage devices, storage systems, active directory, networking, or combinations thereof.

Embodiment 5. The method of embodiment 1, 2, 3, and/or 4, further comprising identifying the infected components using a first model that is trained to detect the malware or other corruptions in the components.

Embodiment 6. The method of embodiment 1, 2, 3, 4, and/or 5, further comprising generating a graph representing the components of the production system.

Embodiment 7. The method of embodiment 1, 2, 3, 4, 5, and/or 6, further comprising identifying the infected components in the graph.

Embodiment 8. The method of embodiment 1, 2, 3, 4, 5, 6, and/or 7, further comprising inputting the graph that identifies the infected components into a second model trained to identify the related components to the infected components.

Embodiment 9. The method of embodiment 1, 2, 3, 4, 5, 6, 7, and/or 8, further comprising including the granular infected component in a forensic kit.

Embodiment 10. The method of embodiment 1, 2, 3, 4, 5, 6, 7, 8, and/or 9, further comprising performing a forensic analysis based on the forensic kit and wherein the related components include attack vectors of the malware that do not appear to be infected.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, or agent, may refer to software objects or routines that execute on the computing system. These terms may also refer to hardware. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
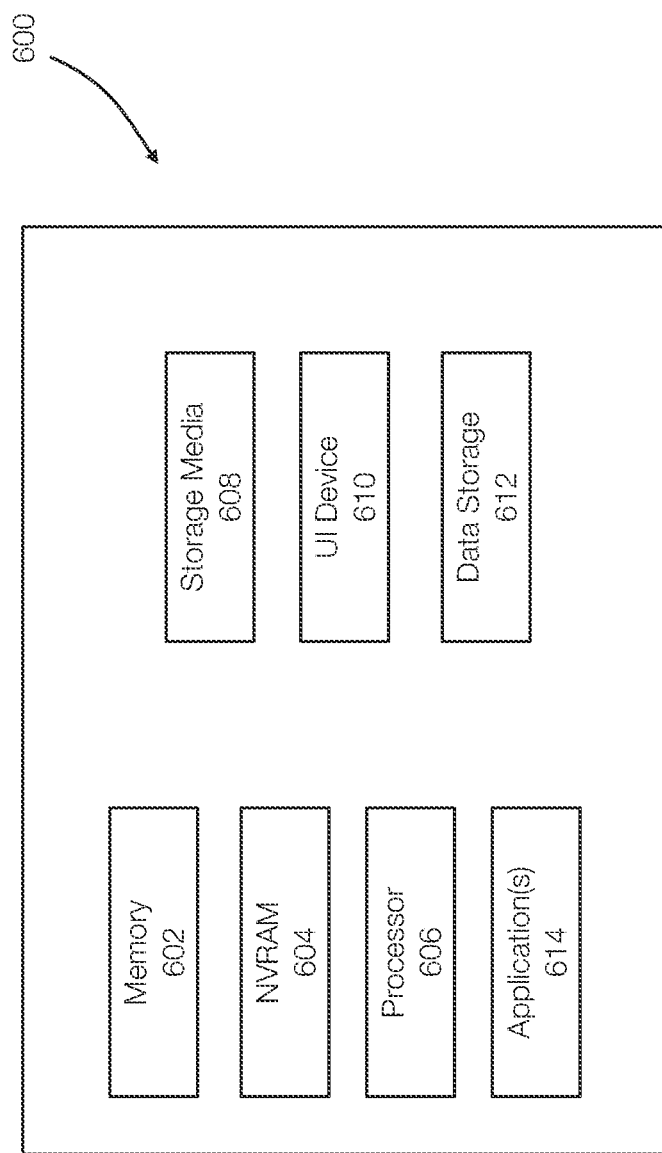
FIG. 6 discloses aspects of a computing device, system, or entity.

With reference briefly now to FIG. 6, any one or more of the entities disclosed, or implied, by the Figures, and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 6302 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid-state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

detecting malware in a production system that includes components;

identifying infected components from among the components of the production system;

identifying related components of the production system from among the components of the production system that are related to the infected components, wherein the related components may be infected with the malware; and generating a granular infected backup that includes only the infected components and the related components and the malware, and not components of the production system that are both not infected components and not related components.

2. The method of claim 1, further comprising triggering a forensic operation upon detecting the malware, wherein the forensic operation is configured to generate the granular infected backup.

3. The method of claim 1, wherein the granular infected backup comprises a snapshot of the infected components and the related components.

4. The method of claim 1, wherein the components include servers, applications, data, storage devices, storage systems, active directory, networking, or combinations thereof.

5. The method of claim 1, further comprising identifying the infected components using a first model that is trained to detect the malware or other corruptions in the components.

6. The method of claim 5, further comprising generating a graph representing the components of the production system.

7. The method of claim 6, further comprising identifying the infected components in the graph.

8. The method of claim 7, further comprising inputting the graph that identifies the infected components into a second model trained to identify the related components to the infected components.

9. The method of claim 8, further comprising including the granular infected component in a forensic kit.

10. The method of claim 9, further comprising performing a forensic analysis based on the forensic kit and wherein the related components include attack vectors of the malware that do not appear to be infected.

11. A non-transitory storage medium having stored therein instructions that are executable by one or more hardware processors to perform operations comprising:

detecting malware in a production system that includes components;

identifying infected components from among the components of the production system;

identifying related components of the production system from among the components of the production system that are related to the infected components, wherein the related components may be infected with the malware; and generating a granular infected backup that includes only the infected components and the related components and the malware, and not components of the production system that are both not infected components and not related components.

12. The non-transitory storage medium of claim 11, further comprising triggering a forensic operation upon detecting the malware, wherein the forensic operation is configured to generate the granular infected backup.

13. The non-transitory storage medium of claim 11, wherein the granular infected backup comprises a snapshot of the infected components and the related components.

14. The non-transitory storage medium of claim 11, wherein the components include servers, applications, data, storage devices, storage systems, active directory, networking, or combinations thereof.

15. The non-transitory storage medium of claim 11, further comprising identifying the infected components using a first model that is trained to detect the malware or other corruptions in the components.

16. The non-transitory storage medium of claim 15, further comprising generating a graph representing the components of the production system.

17. The non-transitory storage medium of claim 16, further comprising identifying the infected components in the graph.

18. The non-transitory storage medium of claim 17, further comprising inputting the graph that identifies the infected components into a second model trained to identify the related components to the infected components.

19. The non-transitory storage medium of claim 18, further comprising including the granular infected component in a forensic kit.

20. The non-transitory storage medium of claim 19, further comprising performing a forensic analysis based on the forensic kit and wherein the related components include attack vectors of the malware that do not appear to be infected.

* * * * *